(12) United States Patent
Koide

(10) Patent No.: US 8,558,922 B2
(45) Date of Patent: Oct. 15, 2013

(54) IMAGE FILE MANAGEMENT APPARATUS AND IMAGE FILE MANAGEMENT METHOD

(75) Inventor: Yuji Koide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1317 days.

(21) Appl. No.: 11/945,155

(22) Filed: Nov. 26, 2007

(65) Prior Publication Data

US 2008/0137991 A1 Jun. 12, 2008

(30) Foreign Application Priority Data

Dec. 7, 2006 (JP) ................................. 2006-330956

(51) Int. Cl.
*H04N 5/76* (2006.01)
(52) U.S. Cl.
USPC ........................................................ 348/231.9
(58) Field of Classification Search
USPC ..................... 348/231.2, 231.5, 231.1, 231.3, 348/231.6–231.9, 231.99
See application file for complete search history.

(56) References Cited

U.S. PATENT DOCUMENTS

| | | | | |
|---|---|---|---|---|
| 7,071,999 B2* | 7/2006 | Lee | ................................ | 348/714 |
| 7,436,440 B2* | 10/2008 | Tagawa | ...................... | 348/231.2 |
| 7,542,071 B2* | 6/2009 | Yaegashi | ........................ | 348/159 |
| 2004/0196370 A1* | 10/2004 | Yaegashi | ........................ | 348/159 |
| 2005/0073594 A1* | 4/2005 | Tagawa | ....................... | 348/231.3 |

FOREIGN PATENT DOCUMENTS

| | | |
|---|---|---|
| JP | 10-293724 A | 11/1998 |
| JP | 2003-069942 A | 3/2003 |
| JP | 2004-032264 A | 1/2004 |
| JP | 2004-343371 A | 12/2004 |
| JP | 2004-343627 A | 12/2004 |
| JP | 2004-349909 A | 12/2004 |

* cited by examiner

*Primary Examiner* — James M Hannett
*Assistant Examiner* — Ahmed A Berhan
(74) *Attorney, Agent, or Firm* — Canon USA, Inc., IP Division

(57) ABSTRACT

An image file management apparatus capable of managing image data and attribute information associated with the image data includes an image file storage unit configured to store an image file including the image data and one or more pieces of attribute information associated with the image data, an attribute information recording unit configured to record at least one attribute information among the one or more pieces of attribute information included in the image file stored by the image file storage unit in association with an identifier of the image data, an attribute information disabling unit configured to disable the at least one attribute information recorded by the attribute information recording unit, and an attribute information restoring unit configured to restore and enable the at least one attribute information disabled by the attribute information disabling unit with respect to the image data.

15 Claims, 13 Drawing Sheets

FIG.4

MAIN INFORMATION

| ATTRIBUTE INFORMATION NAME | TAG NO. |
|---|---|
| TITLE | 0x010e |
| MAKER NAME | 0x010f |
| MODEL NAME | 0x0110 |
| IMAGE ORIENTATION | 0x0112 |
| WIDTH RESOLUTION | 0x011a |
| HEIGHT RESOLUTION | 0x011b |
| RESOLUTION UNIT | 0x0128 |
| SOFTWARE | 0x0131 |
| CHANGE DATE | 0x0132 |
| WhitePoint | 0x013e |
| PrimaryChromaticities | 0x013f |
| YC b Cr Positioning | 0x0213 |
| ReferenceBlackWhite | 0x0214 |
| Copyright | 0x8298 |
| Exif INFORMATION offset | 0x8769 |

FIG.5

SUB INFORMATION

| ATTRIBUTE INFORMATION NAME | TAG NO. | ATTRIBUTE INFORMATION NAME | TAG NO. |
|---|---|---|---|
| EXPOSURE TIME | 0x829a | UserComment | 0x9286 |
| LENS F VALUE | 0x829d | SubsecTime | 0x9290 |
| EXPOSURE CONTROL MODE | 0x8822 | SubsecTimeOriginal | 0x9291 |
| ISOSpeedRatings | 0x8827 | SubsecTimeDigitized | 0x9292 |
| Exif VERSION | 0x9000 | FlashPix VERSION | 0xa000 |
| ORIGINAL SHOOTING DATE AND TIME | 0x9003 | COLOR SPACE INFORMATION | 0xa001 |
| DIGITIZATION DATE | 0x9004 | IMAGE WIDTH | 0xa002 |
| EACH COMPONENT MEANING | 0x9101 | IMAGE HEIGHT | 0xa003 |
| IMAGE COMPRESSION RATE | 0x9102 | RelatedSoundFile | 0xa004 |
| ShutterSpeedValue | 0x9201 | ExifR98 EXTENSION INFORMATION | 0xa005 |
| ApertureValue | 0x9202 | FocalPlaneXResolution | 0xa20e |
| BrightnessValue | 0x9203 | FocalPlaneYResolution | 0xa20f |
| EXPOSURE COMPENSATION AMOUNT | 0x9204 | FocalPlaneResolutionUnit | 0xa210 |
| FULL-APERTURE F VALUE | 0x9205 | ExposureIndex | 0xa215 |
| SubjectDistance | 0x9206 | SencingMethod | 0xa217 |
| AUTOMATIC EXPOSURE PHOTOMETRY MODE | 0x9207 | FILE SOURCE | 0xa300 |
| LIGHT SOURCE | 0x9208 | SceneType | 0xa301 |
| FLASH | 0x9209 | CFAPattern | 0xa302 |
| FOCAL LENGTH OF LENS | 0x920a | | |
| INTERNAL INFORMATION OF CAMERA | 0x927c | | |

FIG.6

MAKER-DEPENDENT INFORMATION

| ATTRIBUTE INFORMATION NAME | MAKER TAG NO. | ATTRIBUTE INFORMATION NAME | MAKER TAG NO. |
|---|---|---|---|
| SHOOTING MODE | 0x0001 | IMAGE SIZE | 0x0010 |
| SHOOTING IMAGE QUALITY | 0x0002 | PHOTOMETRY SYSTEM | 0x0011 |
| FOCUS MODE | 0x0003 | OPTICAL ZOOM STEP VALUE | 0x0012 |
| FLASH MODE | 0x0004 | TITLE | 0x0013 |
| FLASH INTENSITY | 0x0005 | FIRMWARE VERSION | 0x0014 |
| DISTANCE TO SUBJECT | 0x0006 | OWNER NAME | 0x0015 |
| WHITE BALANCE | 0x0007 | OWNER TELEPHONE NUMBER | 0x0016 |
| DIGITAL ZOOM | 0x0008 | OWNER E-MAIL ADDRESS | 0x0017 |
| SHARPNESS | 0x0009 | CameraID | 0x0018 |
| CONTRAST | 0x000a | COLOR | 0x0019 |
| SATURATION | 0x000b | SLOW SYNCHRONIZATION | 0x001a |
| CCD SENSITIVITY | 0x000c | TRANSMISSION DESTINATION E-MAIL ADDRESS | 0x001b |
| MACRO MODE | 0x000d | | |
| SELF-TIMER | 0x000e | | |
| CONTINUOUS SHOOTING MODE | 0x000f | | |

FIG.7

| FILE NAME | 100KANON¥IMG_0001.JPG |
|---|---|
| NUMBER OF PIECES OF ATTRIBUTE INFORMATION | 4 |
| ATTRIBUTE INFORMATION 1 — INFORMATION TYPE | 3 (MAKER-DEPENDENT INFORMATION) |
| ATTRIBUTE INFORMATION 1 — TAG NO. | 0x15 |
| ATTRIBUTE INFORMATION 1 — ATTRIBUTE INFORMATION | ENCRYPTED DATA OF "OWNER NAME" |
| ATTRIBUTE INFORMATION 2 — INFORMATION TYPE | 3 (MAKER-DEPENDENT INFORMATION) |
| ATTRIBUTE INFORMATION 2 — TAG NO. | 0x16 |
| ATTRIBUTE INFORMATION 2 — ATTRIBUTE INFORMATION | ENCRYPTED DATA OF "OWNER TELEPHONE NUMBER" |
| ATTRIBUTE INFORMATION 3 — INFORMATION TYPE | 3 (MAKER-DEPENDENT INFORMATION) |
| ATTRIBUTE INFORMATION 3 — TAG NO. | 0x17 |
| ATTRIBUTE INFORMATION 3 — ATTRIBUTE INFORMATION | ENCRYPTED DATA OF "OWNER E-MAIL ADDRESS" |
| ATTRIBUTE INFORMATION 4 — INFORMATION TYPE | 3 (MAKER-DEPENDENT INFORMATION) |
| ATTRIBUTE INFORMATION 4 — TAG NO. | 0x1b |
| ATTRIBUTE INFORMATION 4 — ATTRIBUTE INFORMATION | ENCRYPTED DATA OF "TRANSMISSION DESTINATION E-MAIL ADDRESS" |

FIG.11

| RECORDING MEDIUM IDENTIFICATION NUMBER |
|---|
| DISABLED STATE FLAG |
| ATTRIBUTE INFORMATION DATA OF IMAGE FILE 1 |
| ATTRIBUTE INFORMATION DATA OF IMAGE FILE 2 |
| ⋮ |
| ATTRIBUTE INFORMATION DATA OF IMAGE FILE N |

FIG.12

| ATTRIBUTE INFORMATION DATA OF IMAGE FILE 1 |
|---|
| ATTRIBUTE INFORMATION DATA OF IMAGE FILE 2 |
| ⋮ |
| ATTRIBUTE INFORMATION DATA OF IMAGE FILE N |

IMAGE FILE MANAGEMENT APPARATUS AND IMAGE FILE MANAGEMENT METHOD

BACKGROUND OF THE INVENTION

1. Field of the Invention

The present invention relates to an image file management apparatus, an image file management method, and a storage medium, and more particularly to a technology for protecting attribute information recorded in association with image data.

2. Description of the Related Art

The market for image pickup apparatuses, such as digital video cameras or digital cameras, which capture an image of a subject to generate and store image data in a storage medium has recently expanded. This market expansion has been accompanied by emergence of a printer that can directly connect with a digital video camera or digital camera to load image data stored therein without using any computer and can select and print desired image data among the loaded image data. Photo-finishing laboratory print services using such a printer have expanded as well.

For a printing apparatus, such as the above-mentioned printer, as a method for loading image data captured by a digital video camera or digital camera, use of a removable memory card may be advantageous in terms of transfer rate. Thus, a large number of printers equipped with memory card connection slots have been marketed.

An image file generated with, for example, a digital camera ordinarily includes image data and attribute information, which contains shooting setting information and shooting date information. Accordingly, in the printer, attempts have been made to obtain high print image quality by using shooting setting information included in the ancillary information to change printing conditions.

However, the attribute information may contain private information, such as a photographer name, a telephone number, or a mail address, in addition to the shooting setting information. In the case of using the above-mentioned photo-finishing laboratory print services, such private information may possibly be read together with image data via a printer, thus causing insecurity among users.

Japanese Patent Application Laid-Open No. 2003-69942 discusses a method for preventing leakage of information accompanying image data, unless otherwise wished by a user, by encrypting attribute information associated with the image data for each type of information and recording the encrypted attribute information in a file header of the image data.

According to the method discussed in Japanese Patent Application Laid-Open No. 2003-69942, specific attribute information of the image data is always in an encrypted state. Thus, the user himself has to release the encrypted state when copying the image data into a computer to use the attribute information. As a result, management of information regarding user's privacy among the ancillary information associated with image data is complex.

SUMMARY OF THE INVENTION

The present invention is directed to an image file management apparatus that is capable of managing information regarding user's privacy among attribute information associated with image data with a simple operation.

According to an aspect of the present invention, an image file management apparatus capable of managing image data and attribute information associated with the image data includes an image file storage unit configured to store an image file including the image data and one or more pieces of attribute information associated with the image data, an ancillary information recording unit configured to record at least one ancillary information among the one or more pieces of ancillary information included in the image file stored by the image file storage unit in association with an identifier of the image data, an ancillary information disabling unit configured to disable the at least one ancillary information recorded by the ancillary information recording unit, and an attribute information restoring unit configured to restore and enable the at least one attribute information disabled by the ancillary information disabling unit with respect to the image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of written contents and tag addresses of main information in the Exif file according to the first exemplary embodiment.

FIG. 5 illustrates an example of written contents and tag addresses of sub information in the Exif file according to the first exemplary embodiment.

FIG. 6 illustrates an example of written contents and tag addresses of maker-dependent information in the Exif file according to the first exemplary information.

FIG. 7 illustrates an example of a format of attribute information data with respect to an image file according to the first exemplary embodiment.

FIG. 11 illustrates an example of an attribute information data structure according to the second exemplary embodiment.

FIG. 12 illustrates an example of a format of an attribute information data file according to the first exemplary embodiment.

DETAILED DESCRIPTION OF THE EMBODIMENTS

Various exemplary embodiments, features, and aspects of the invention will be described in detail below with reference to the drawings.

First Exemplary Embodiment

Figure 1:
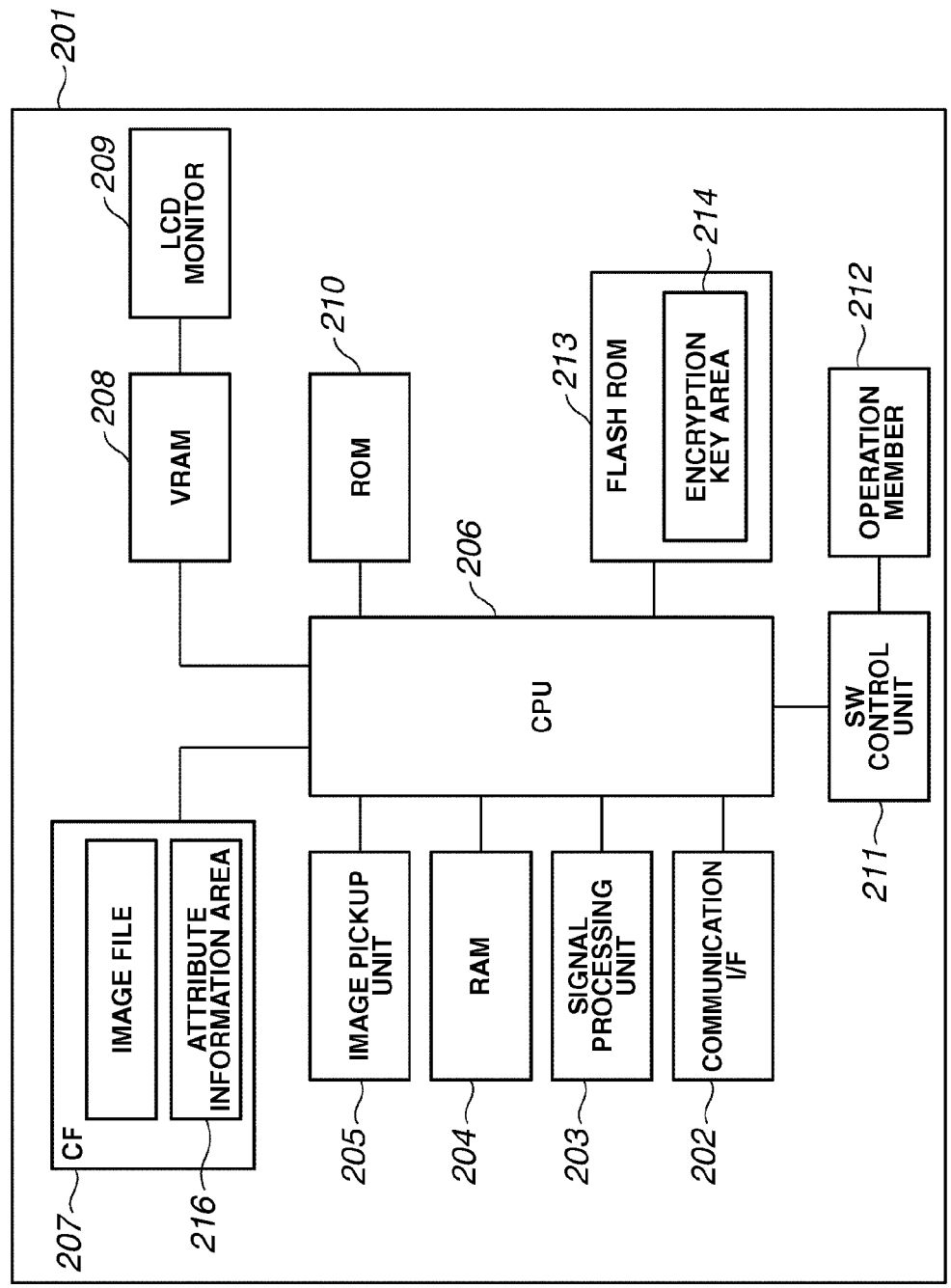
FIG. 1 is a block diagram illustrating an example of functional configuration of a digital camera according to a first exemplary embodiment of the present invention.

FIG. 1 is a block diagram illustrating an example of a functional configuration of a digital camera 201 as an example of an image file management apparatus according to a first exemplary embodiment of the present invention.

The digital camera 201 includes an image pickup unit 205 equipped with a shooting lens, a charge-coupled device (CCD) for receiving subject light incident via the shooting lens and executing photoelectric conversion to generate an image signal, and a rear-stage analog/digital (A/D) conversion circuit. Under control of a central processing unit (CPU) 206, a digital image signal is output from the image pickup unit 205, subjected to signal processing by a signal processing unit 203, and then temporarily stored in a random access memory (RAM) 204. Subsequently, shooting setting information is added as attribute information to a header area of the generated digital image signal, and lastly stored as an image file in a recording medium 207.

The recoding medium 207 for recording an image file is specifically a CompactFlash® memory card. However, a memory card, a magneto-optical disk, or a removable medium may be used instead. In the digital camera 201 according to an exemplary embodiment, an attribute information area 216 for storing attribute information of image data is provided in the recording medium 207.

A read-only memory (ROM) 210, an SW control unit 211 for controlling an input from an operation member 212, and a video RAM (VRAM) 208 for storing display data of a digital image signal or display data of various user interfaces are connected to the CPU 206. Additionally, a communication interface 202 and a flash ROM 213 for storing various parameters or various information are connected to the CPU 206. The CPU 206 according to an exemplary embodiment functions as an image file storage unit, an attribute information recording unit, an attribute information disabling unit, an ancillary information restoring unit, an encryption unit, a decryption unit, a decryption information recording unit, a decryption information retrieval unit, an image file generation unit, and a determination unit.

The flash ROM 213 includes an encryption key area 214 for storing encryption key information. Contents of the display data stored in the VRAM 208 are displayed on a liquid crystal display (LCD) monitor 209. The operation member 212 includes a power switch (SW) (not illustrated) for controlling power ON/OFF, a release SW (not illustrated) for instructing shooting, and an SW (not illustrated) for instructing the LCD monitor 209 to display a digital image signal. The operation member 212 further includes an SW (not illustrated) for displaying a menu on the LCD monitor 209, an SW (not illustrated) used for feeding/returning an image frame or changing a menu selected state, and a touch panel (not illustrated) for directly giving an instruction on a liquid crystal.

The digital camera 201 according to an exemplary embodiment uses an "Exif" file format which is a generally used representative image file format for a recording system for recoding an image file. The Exif file format will be described below.

Figure 3:
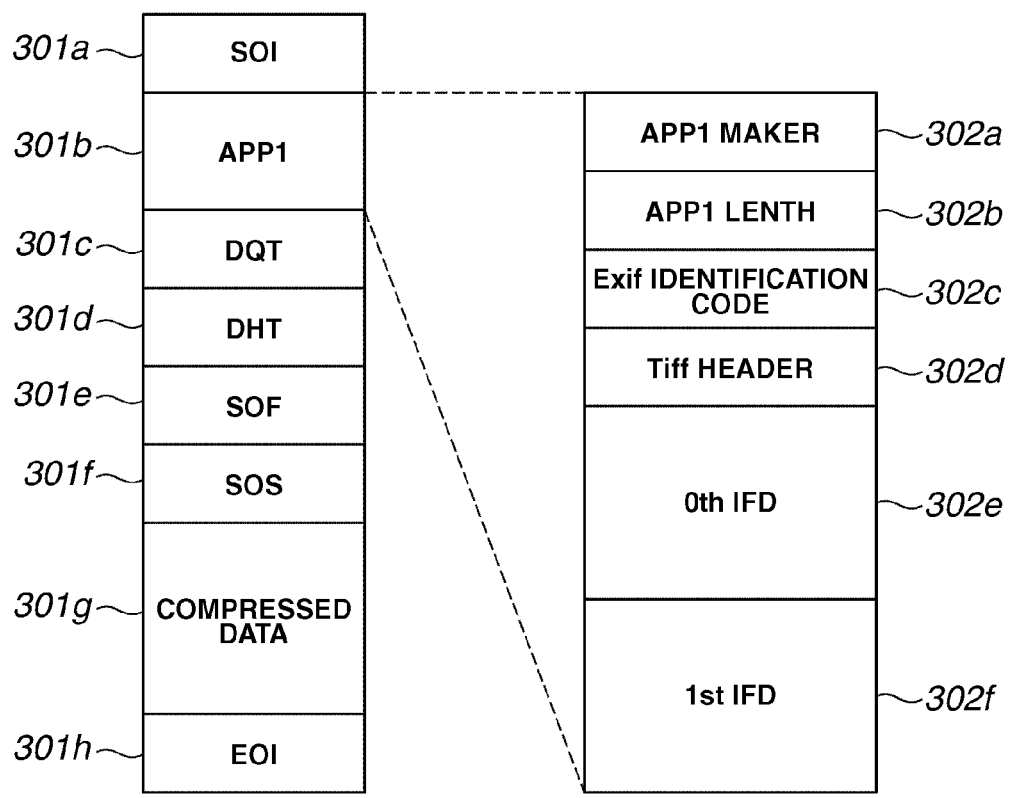
FIG. 3 illustrates a structure of an Exif file.

FIG. 3 illustrates an example structure of an Exif file. The structure of the Exif file is basically a normal Joint Photographic Experts Group (JPEG) image format, and has a thumbnail image or data such as shooting-related data embedded therein in a format compliant with JPEG regulations. By using an Internet browser, an image viewer, or photoretouch software supporting the JPEG format, the Exif file can be viewed as a normal JPEG image.

As illustrated on the left side of FIG. 3, the JPEG file includes, sequentially from the first, "Start of Image (SOI)/0xFFD8" 301a, "APP1" 301b, "Define Quantization Table (DQT)" 301c, "Define Huffman Table (DHT)" 301d, "Start of Frame (SOF)" 301e, "Start of Scan (SOS) marker" 301f, "compressed data (data)" 301g, and "End of Image/0xFFD9 (EOI)" 301h.

Among markers used for JPEG, markers 0xFFE0 to 0xFFEF are called application markers. These markers are not necessary for decoding JPEG images, but defined as data areas used for application programs. In the Exif file format, the marker APP1 (0xFFE1) is used for storing a shot digital image signal in a JPEG image. A structure of "APP1" 301b is illustrated on the right side of FIG. 3.

As illustrated in FIG. 3, the structure of the "APP1" 301b includes, sequentially from the first, an APP1 Marker (FFE1/2-byte) area 302a, an APP1 Length (side of 2-byte APP1 area) area 302b, and an Exif identification code area 302c. In the Exif identification code area 302c, "Exif" of ASCII characters is stored as an identifier, followed by 2-byte "0x00" (not illustrated). Then, data is stored in a Tiff format.

First 8 bytes of the Tiff format define a Tiff header area 302d, and first 2 bytes define a format of byte arrangement. 0x4d4d: "MM" indicates Motorola format, and 0x4949: "II" indicates Intel format. A first image file directory (IFD) is stored in a 0th IFD of main image (IFD) area 302e subsequent to the Tiff header area 302d. Normally, main image data and attribute information associated with image data are stored in this area, and items written are classified into main information, sub information (Exif/SubIFD/0x8769), maker-dependent information (Maker note/0x927c).

FIG. 4 illustrates an example of written contents and "tag" addresses indicating descriptions in main information. The main information includes general pieces of information, such as a title, a maker name and a model name of a digital camera, image orientation, width resolution, height resolution, a resolution unit, software, change date and time or the like.

FIG. 5 illustrates an example of written contents and "tag" addresses indicating descriptions in sub information. The sub information includes detailed information of a digital camera, such as a light source or a focal length of a lens, and various shooting conditions, such as an exposure time, an F value, ISO sensitivity, and an automatic exposure photometry mode.

FIG. 6 illustrates an example of maker-dependent data. Written contents and "tag" addresses of the maker-dependent data can be set dependent on each maker. A 1st IFD area 302f follows the 0th IFD area 302e. Normally, a thumbnail image can be recorded in this area.

In the digital camera 201 according to an exemplary embodiment, personal information regarding an owner of the digital camera is written in a maker-dependent information area, such as that illustrated in FIG. 6. For example, an owner name is written in "maker tag=0x0015", and an owner telephone number is written in "maker tag=0x0016". An owner E-mail address is written in "maker tag=0x0017", and a transmission destination address of an image file is written in "maker tag=0x001b".

Referring back to FIG. 3, the "Define Quantization Table (DQT)" 301c on the left side of FIG. 3 defines an entity of a quantization table. The "Define Huffman Table (DHT)" 301d defines an entity of a Huffman table. The "Start of Frame (SOF)" 301e indicates a start of a frame, and the "Start of Scan (SOS)" 301f indicates a start of image data. The "End of Image/0xFFD9 (EOI)" 301h indicates an end of an image.

According to an exemplary embodiment, simultaneously with image file generation, the encryption unit encrypts predetermined information among the attribute information recorded in the image file, and the attribute information recording unit records the information as ancillary information data in the ancillary information area 216 in association with an identifier of the image data.

FIG. 7 illustrates an example of a format of attribute information data for a certain image file. The attribute information data includes a file name area, an area of a number of pieces of attribute information, an information type area, a tag number area, and an encrypted attribute information area. A plurality of information type areas, tag number areas, and encrypted attribute information areas corresponding to the number of pieces of attribute information can be present.

In the example illustrated in FIG. 7, values of an owner name (tag No. 0x15), an owner telephone number (tag No. 0x16), an owner E-mail address (tag No. 0x17), and a transmission destination E-mail address (tag No. 0x1b) of maker-dependent information are encrypted to be recorded.

In the digital camera 201 according to an exemplary embodiment, a Design rule for Camera File system (DCF) format is used as a directory configuration system when an image file is stored. According to the DCF format, a directory DCIM is created in a root directory of a recording medium, such as the recording medium 207, and a plurality of image directories are created below the directory DCIM. Each image file is recorded below each image directory.

An MISC directory further is created below the DCIM directory. According to an exemplary embodiment, attribute information data of a format illustrated in FIG. 7 that are sequentially arranged for all the image files in the recording medium 207 are recorded as one attribute information data file. In this case, the attribute information data file is recorded as a file name of ¥¥DCIM¥MISC¥PRIVATE.DAT.

FIG. 12 illustrates an example of a format of an attribute information data file. As described above, the attribute information data is generated at the same timing as that of the image file generation. Accordingly, in reality, for each shooting execution, attribute information data regarding a newly generated image file is recorded in the attribute information data file which has been present in the recording medium 207.

Thus, as the recording of the attribute information data is executed at the same timing as that of the shooting, the digital camera 201 according to an exemplary embodiment can shorten time necessary for disabling attribute information.

Among pieces of attribute information of an image, information recorded as attribute information data in the attribute information area 216 of the recording medium 207 may be personal information regarding the owner of the digital camera 201, such as an owner name, a telephone number, or an E-main address. A user of the digital camera 201 may select which attribute information to target using the menu operation.

Next, referring to the flowchart of FIG. 8, a procedure for disabling attribute information in an image file in the digital camera 201 according to an exemplary embodiment will be described.

First, in step S801, the digital camera 201 determines whether an instruction to disable attribute information in an image file has been generated by the user via the operation member 212. If the disabling instruction has not been received (NO in step S801), the process waits until the instruction is generated. On the other hand, if the disabling instruction has been received (YES in step S801), the process proceeds to step S802.

When the user creates a Digital Print Order Format (DPOF) file in the digital camera 201, a message can be displayed on, for example, the LCD monitor 209 of the digital camera 201 to make an inquiry about whether to disable attribute information contained in an image file. In this case, if the user selects disabling, a process of disabling the attribute information in the image file can be started.

The DPOF file is a file format standardized for the purpose of storing automatic print information together with the image file in a removable medium to use it for printing. In this file format, information necessary for printing an image file is written.

Conventionally, in the case of executing printing by loading a removable medium into a printer in photofinishing laboratory print services, a user creates a DPOF file beforehand to designate an image file to be printed. Thus, the creation of the DPOF file may create a possibility that the recording medium 207 will be removed from the digital camera 201 to be loaded into the printer immediately after.

When the user opens a CF cover of the digital camera 201, similarly, a message can be displayed on, for example, the LCD monitor 209 of the digital camera 201 to make an inquiry about whether to disable attribute information contained in an image file. In this case, when the user selects disabling, a process of disabling the attribute information in the image file can be started. It is because of a possibility that the user may remove the recording medium 207 from the digital camera 201 to load it into the printer.

When the user uses the communication interface 202 of the digital camera 201 to connect the digital camera 201 to an external device, similarly, a message can be displayed on, for example, the LCD monitor 209 of the digital camera 201. Then, an inquiry is made about whether to disable attribute information contained in an image file and, when the user selects disabling, a process for disabling the attribute information in the image file can be started.

The digital camera 201 may include a USB interface to be connected to an external device with a protocol compliant with USB Mass Storage Class. In this case, the recording medium 207 of the digital camera 201 is mounted in a file system of the external device, thus enabling obtaining all of the files of the recording medium 207 from the external device. Thus, since attribute information of the image file becomes accessible from the external device, there is a danger that personal information will be read.

Figure 8:
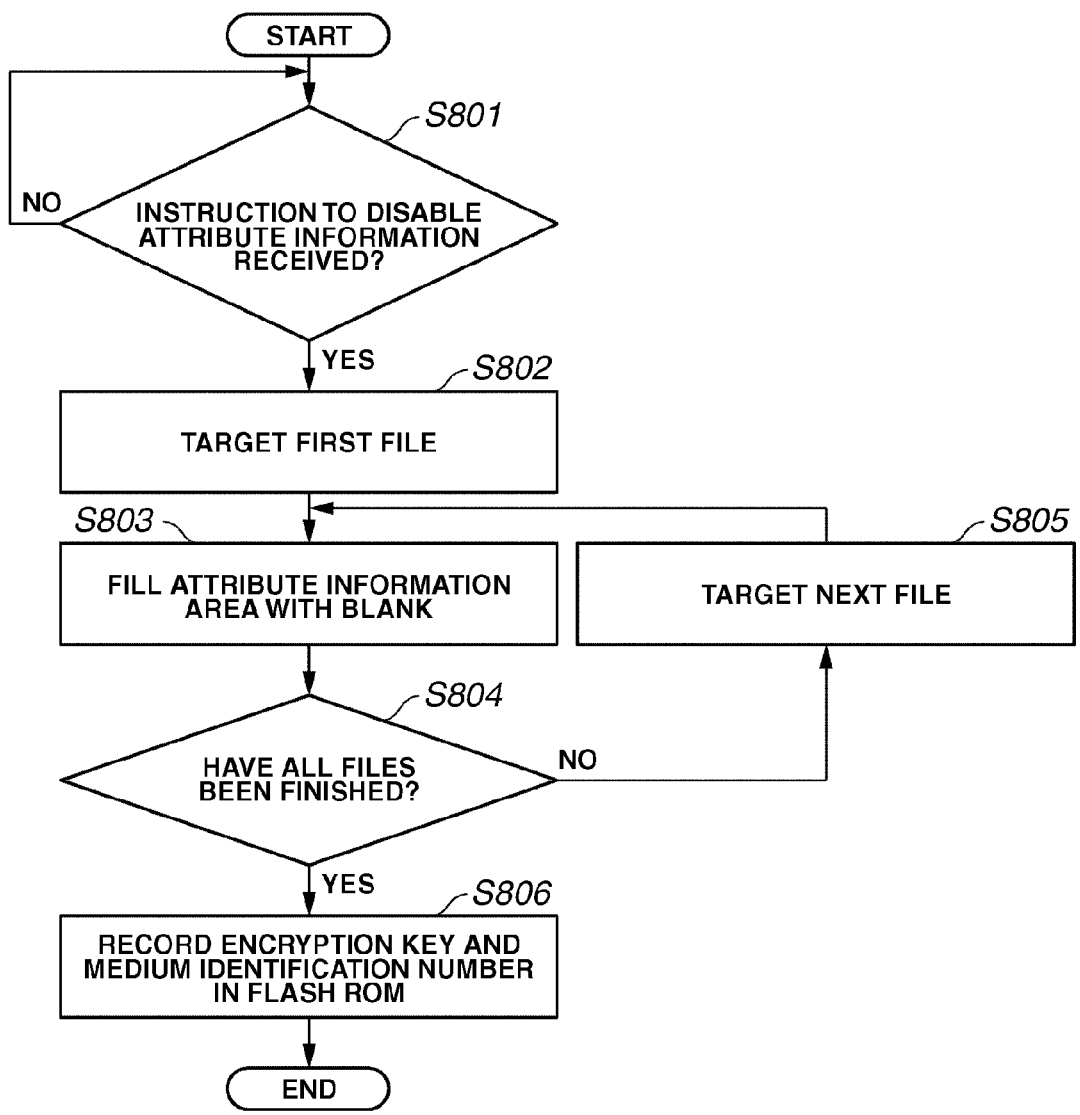
FIG. 8 is a flowchart illustrating an example of an operation procedure for disabling attribute information in an image file according to the first exemplary embodiment.

Now referring to back to FIG. 8, regarding the disabling procedure, among the pieces of attribute information of all of the image files in the recording medium 207, information recorded as the attribute information data illustrated in FIG. 7 is processed with the following procedure. First, in step S802, target setting is carried out for the first image file.

In step S803, the attribute information disabling unit fills a corresponding attribute information area in the image file with blank characters or eliminates the area with a relevant tag to delete data regarding personal information. More specifically, in the digital camera 201 according to an exemplary embodiment, the owner name area, the owner telephone number area, the owner E-mail address area, and the transmission destination address area of the maker-dependent information area illustrates in FIG. 6 are filled with blank characters.

In step S804, whether data regarding personal information have been deleted for all of the image files is determined. If there is still an image file whose data regarding personal information has not been deleted (NO in step S804), the process proceeds to step S805 to carry out target setting for a next image file, and then returns to step S803. On the other hand, if data regarding personal information has been deleted for all of the image files (YES in step S804), the process proceeds to step S806.

In step S806, the decryption information recording unit records information on an encryption key (information for decryption) used for generating attribute information data and an identification number of the recording medium 207 in the encryption key area 214 of the flash ROM 213 in the digital camera 201. Simultaneously, a flag indicating a disabled state of the attribute information is provided and set in the encryption key area 214. A mechanism of the identification number of the recording medium 207 can be realized by generating a unique number for each loaded recording medium 207 and writing the number in a specific area of the recording medium 207 via the digital camera 201.

Figure 2:
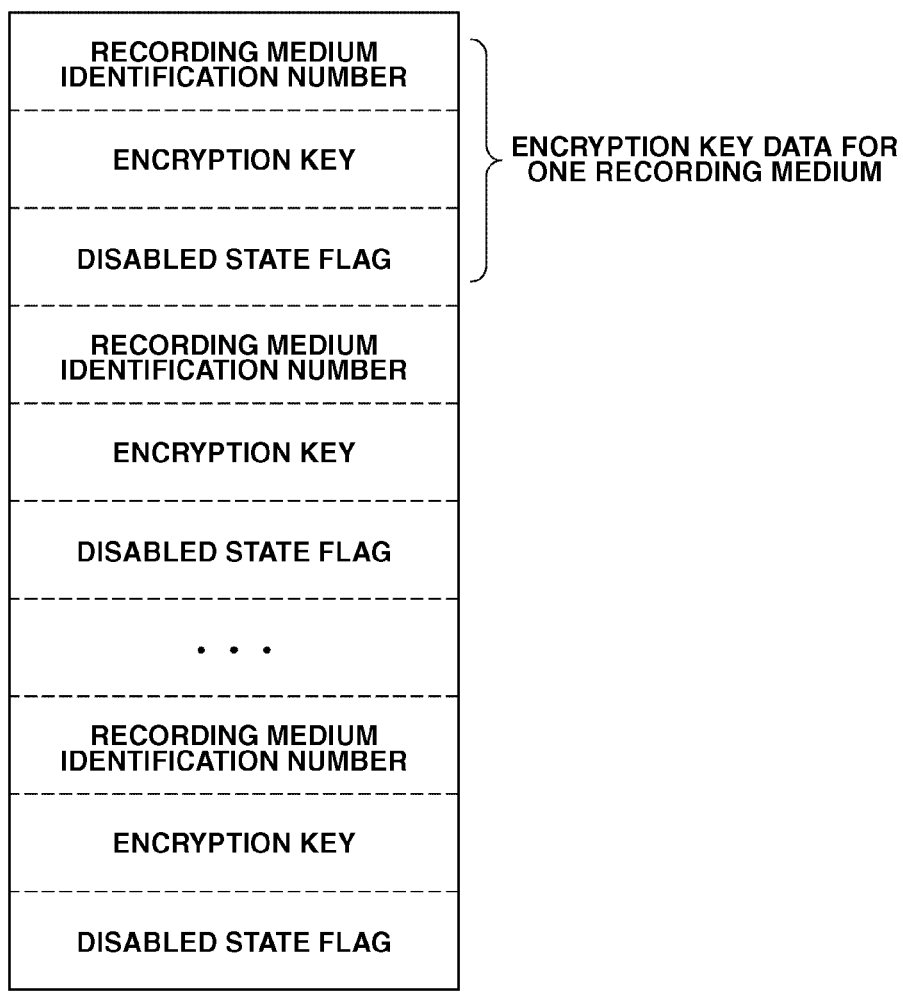
FIG. 2 illustrates an example of a data structure of an encryption key area according to the first exemplary embodiment.

FIG. 2 illustrates an example of a data structure of the encryption key area 214. For each recording medium 207, an identification number field, an encryption key field, and a disabled state flag field of the recording medium 207 are sequentially present. For each of the recording media 207 loaded in the digital camera 201, an arrangement of these data structures is held. If a capacity of the flash ROM 213 is not enough, for a recording medium 207 whose disabled state flag is OFF, the data arrangement for the recording medium 207 can be deleted together with the data structure.

Thus, in the digital camera 201 according to an exemplary embodiment, as an encryption key varies with different recording media 207, even if decryption is carried out, a range of its influence can be reduced.

According to an exemplary embodiment, the attribute information data is recorded in the attribute information data file at the same timing as that of shooting. On the other hand, an attribute information data file can be generated at timing of disabling attribute information in an image file (timing of executing the process illustrated in the flowchart of FIG. 8). In this case, a time period required for shooting an image can be further shortened.

Next, referring to the flowchart of FIG. 9, a procedure for restoring attribute information in an image file in the digital camera 201 according to an exemplary embodiment will be described.

In step S901, the process for restoring attribute information in an image file is started when the user of the digital camera 201 loads the recording medium 207 into the digital camera 201.

In step S902, upon the start of the restoration process, first, an identification number is obtained from the loaded recording medium 207. In step S903, the decryption information retrieval unit checks whether the identification number obtained as a retrieval key is present in the encryption key area 214 of the flash ROM 213 in the digital camera 201.

If the obtained identification number is not present (NO in step S903), the process ends. On the other hand, if the obtained identification number is present (YES in step S903), the process proceeds to step S904. In step S904, the determination unit checks the flag information set in step S806 of FIG. 8 to determine whether attribute information in the recording medium 207 is in a disabled state.

If the attribute information in the recording medium 207 is not in a disabled state (NO in step S904), the process ends. On the other hand, if the attribute information in the recording medium 207 is in a disabled state (YES in step S904), the process proceeds to step S905. In step S905, the encryption key recorded in the step S806 of FIG. 8 is obtained.

In step S906, the decryption unit reads an attribute information data file recorded in the attribute information area 216 of the recording medium 207, and decrypts the attribute information data using the obtained encryption key. In step S907, target setting is carried out for the first image file. In step S908, the attribute information restoring unit writes back the decrypted attribute information data in the image file to enable the attribute information data for the target image file.

In step S909, whether the decrypted attribute information data has been written back for all of the image files in the recording medium 207 is determined. If there is still an image file whose data has not been written back (NO in step S909), the process proceeds to step S910 to carry out target setting for a next image file, and the process returns to step S908. On the other hand, if the decrypted attribute information data has been written back for all of the image files (YES in step S909), the process ends.

As described above, according to an exemplary embodiment, when there is a possibility of leakage of private information, for example, when the user uses photofinishing laboratory print services, the digital camera 201 can disable information regarding user's privacy among attribute information associated with image data in the recording medium 207 with a simple operation.

As the attribute information is encrypted to be stored in the recording medium 207, the attribute information disabled once can be restored by loading the recording medium 207 into the digital camera 201 again. Accordingly, when the user himself of the digital camera 201 wishes to use the attribute information, or disabling is unnecessary, the attribute information can be read without any problems.

The above-described exemplary embodiment has an advantage in that the user does not have to designate an encryption key or remember a key for decryption when the attribute information is encrypted. Even the image data not subjected to disabling and the image data subjected to disabling comply with the Exif file format. Thus, even other apparatuses which process general applications or image files can also process image data generated according to the exemplary embodiment.

Second Exemplary Embodiment

Figure 10:
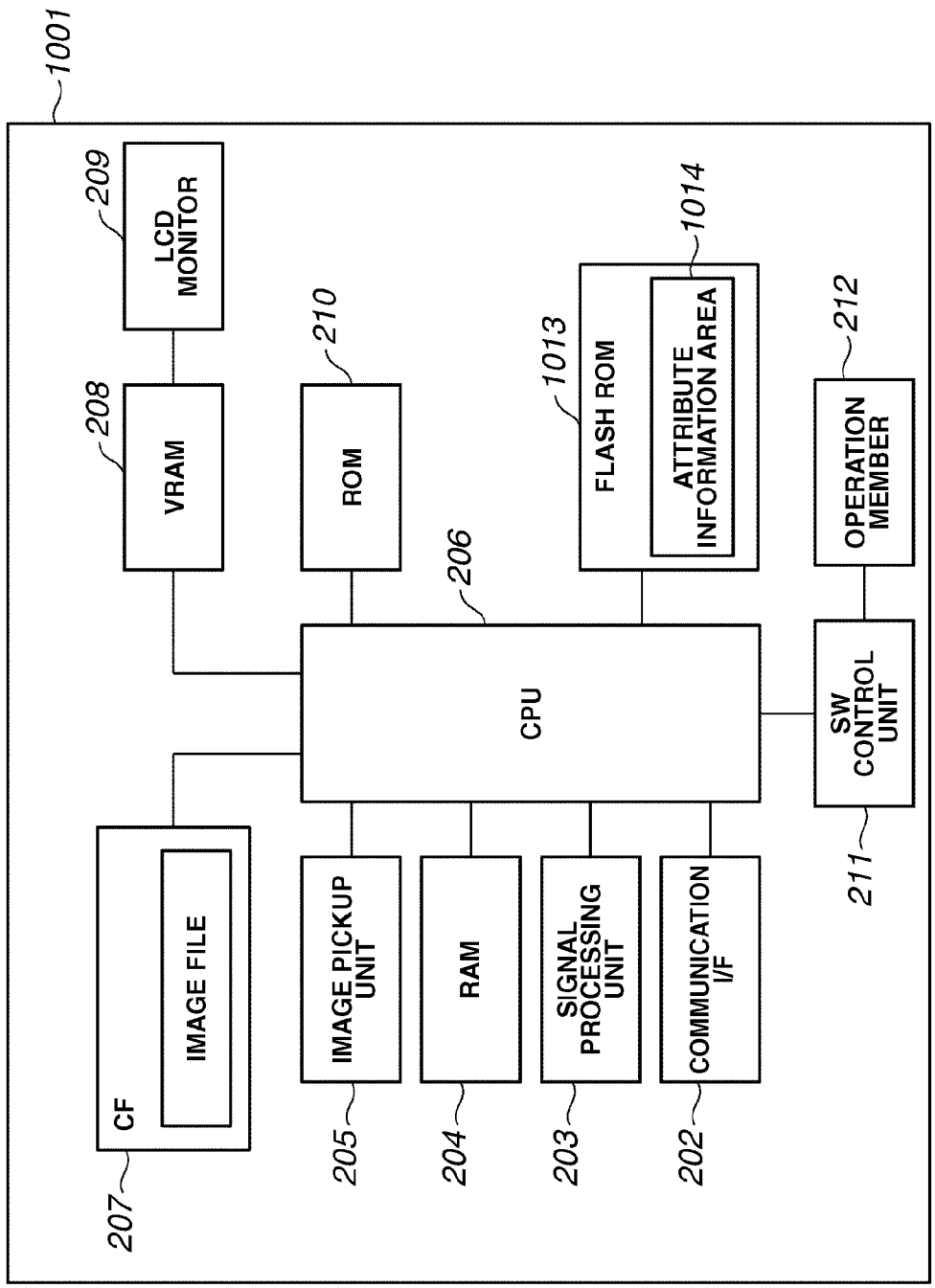
FIG. 10 is a block diagram illustrating a functional configuration example of a digital camera according to a second exemplary embodiment of the present invention.

FIG. 10 is a block diagram illustrating a functional configuration example of a digital camera 1001 according to a second exemplary embodiment of the present invention. The digital camera 1001 illustrated in FIG. 10 is similar to the digital camera 201 illustrated in FIG. 1. A difference is that the digital camera 1001 of the second exemplary embodiment includes an area 1014 for storing attribute information of image data in a flash ROM 1013. The digital camera 1001 of the second exemplary embodiment does not include an area for storing encryption key information in the flash ROM 1013.

As in the case of the first exemplary embodiment, the digital camera 1001 of the second exemplary embodiment uses an Exif file format as a recording system when an image file is recorded. Also, as in the case of the first exemplary embodiment, personal information regarding an owner of the digital camera 1001 is written in the maker-dependent information area illustrated in FIG. 6.

According to the second exemplary embodiment, the attribute information recording unit records predetermined information among attribute information recorded in an image file at the same timing as that of image file generation as attribute information data in the attribute information area 1014 in association with an identifier of image data. A format of the attribute information data for a certain image file is almost similar to that illustrated in FIG. 7. However, according to the second exemplary embodiment, each attribute information is recorded without being encrypted.

According to the second exemplary embodiment, pieces of attribute information of the format illustrated in FIG. 7 which are sequentially arranged for all image files in a recording medium 207 are recorded as one data structure. In this case, an identification number taking a unique value for each recording medium 207 is written in a head of the attribute information data structure. In the next field, a flag indicating whether attribute information of image files in the recording medium 207 is in a disabled state is written. FIG. 11 illustrates an example of attribute information data structure.

As described above, the attribute information data is generated at the same timing of image file generation. Accordingly, in reality, for each shooting execution, attribute information data regarding a newly generated image file is recorded in the attribute information data structure which has been present in the flash ROM 1013. Thus, in the digital camera 1001 according to the second exemplary embodiment, as the attribute information data is recorded at the same timing as that of shooting, a time period required for disabling attribute information can be shortened.

In the digital camera 1001 according to the second exemplary embodiment, the attribute information data is recorded in the flash ROM 1013. Accordingly, as compared with the case of recording in the recording medium 207, there is not a danger that the user will inadvertently delete the attribute information data. The attribute information data itself is recorded in the flash ROM 1013 in the digital camera 1001 to inhibit its reading by the user of the digital camera 1001. Thus, there is not a danger of decryption.

In the digital camera 1001 according to the second exemplary embodiment, a procedure for disabling attribute information in an image file is similar to that of the flowchart of FIG. 8. According to the second exemplary embodiment, however, the attribute information data is recorded in the flash ROM 1013 without being encrypted. Thus, in step S806 of FIG. 8, an operation for writing information on an encryption key and an identification number of the recording medium 207 in the flash ROM 1013 is not carried out. Only an operation for setting flag information indicating disabling (a disabled state flag in the attribute information data structure illustrated in FIG. 11) is carried out.

In the digital camera 1001 according to the second exemplary embodiment, the recording of attribute information data in the attribute information data structure is carried out at the same timing as that of shooting. The attribute information data structure can be generated at a timing of disabling attribute information in the image file (timing of executing the process illustrated in the flowchart of FIG. 8). In this case, a time period required for shooting an image can be shortened more.

Next, referring to the flowchart of FIG. 13, a procedure for restoring attribute information in an image file will be described. In the digital camera 1001 according to the second exemplary embodiment, the procedure for restoring attribute information in an image file is almost similar to that of the flowchart of FIG. 9.

In step S1301, the process of restoring attribute information in an image file is started when the user of the digital camera 1001 loads a recording medium 207 into the digital camera 1001. In step S1302, upon the start of the restoration process, first, an identification number is obtained from the loaded recording medium 207. In step S1303, whether the identification number obtained as a retrieval key is present in the attribute information area 1014 of the flash ROM 1013 in the digital camera 1001 (step S1303).

If the obtained identification number is not present (NO in step S1303), the process ends. On the other hand, if the obtained identification number is present (YES in step S1303), the process proceeds to step S1304. In step S1304, the determination unit checks flag information written in the second field of the attribute information data structure illustrated in FIG. 11 to determine whether attribute information of image files in the recording medium 207 is in a disabled state.

If attribute information of image files in the recording medium 207 is not in a disabled state (NO in step S1304), the process ends. On the other hand, if attribute information of image files in the recording medium 207 is in a disabled state (YES in step S1304), the process proceeds to step S1305, in which target setting is carried out for the first image file. According to the second exemplary embodiment, no encryption/decryption is executed, and thus steps S905 and S906 of FIG. 9 are not executed. Then, in step S1306, for the target image file, attribute information data recorded in the attribute information area 1014 of the flash ROM 1013 is written back in the attribute information area of the image file to enable the attribute information data.

In step S1307, whether the attribute information data has been written back for all of the image files in the recording medium 207 is determined. If there is still an image file whose data has not been written back (NO in step S1307), the process proceeds to step S1308 to carry out target setting for the next image file, and the process returns to step S1306. On the other hand, if the attribute information data has been written back for all of the image files (YES in step S1307), the process ends.

As described above, according to the second exemplary embodiment, when there is a possibility of leakage of private information, for example, when the user uses photofinishing laboratory print services, the digital camera 1001 can disable information regarding user's privacy among pieces of attribute information associated with image data in the recording medium 207 with a simple operation.

The attribute information is recorded in the flash ROM 1013 of the digital camera 1001. Accordingly, the attribute information disabled once can be restored by loading the recording medium 207 into the digital camera 1001 again. Thus, when the user himself of the digital camera 1001 wishes to use the attribute information, or disabling is unnecessary, the attribute information can be read without any problems.

As the attribute information of the header area of the image file is not encrypted, the user does not have to designate an encryption key or remember a key for decryption. Even the image data not subjected to disabling and the image data subjected to disabling comply with the Exif file format. Thus, even other apparatuses which process general applications or image files can process image data generated according to the second exemplary embodiment.

Other Exemplary Embodiments

The present invention can be applied to an apparatus other than a digital camera, such as a portable telephone or an image browsing apparatus which processes an image file. The units constituting the image file management apparatus and the steps of the image file management method according to an exemplary embodiment of the present invention can be realized by operating a program stored in a RAM or a ROM of a computer. The program and a computer readable storage medium storing the program configure the invention.

The present invention can be implemented by an embodiment of, e.g., a system, an apparatus, a method, a program or a storage medium. Specifically, the invention can be applied to a system which includes a plurality of devices, or an apparatus which includes a single device.

Figure 9:
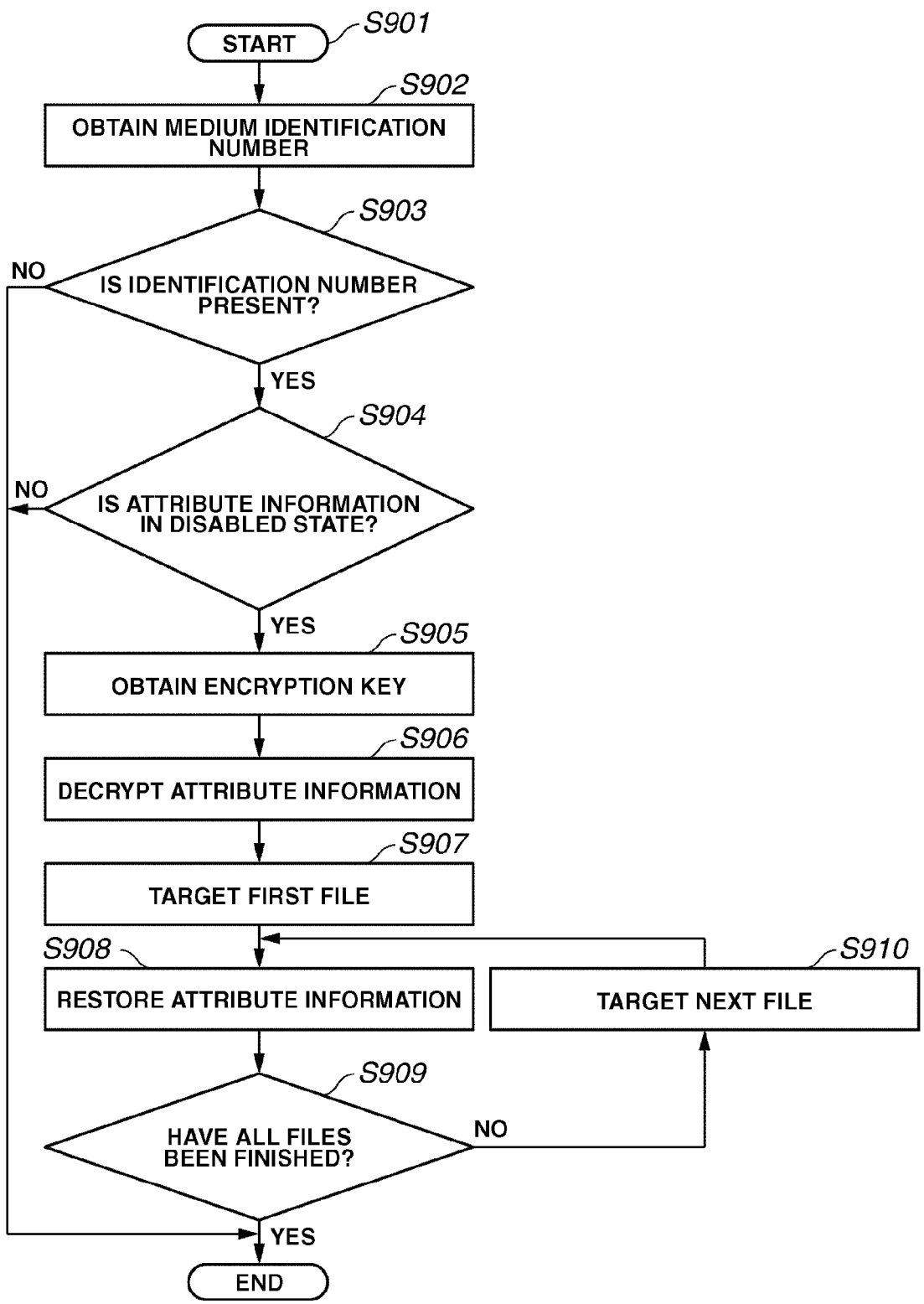
FIG. 9 is a flowchart illustrating an example of an operation procedure for restoring attribute information in an image file according to the first exemplary embodiment.
Figure 13:
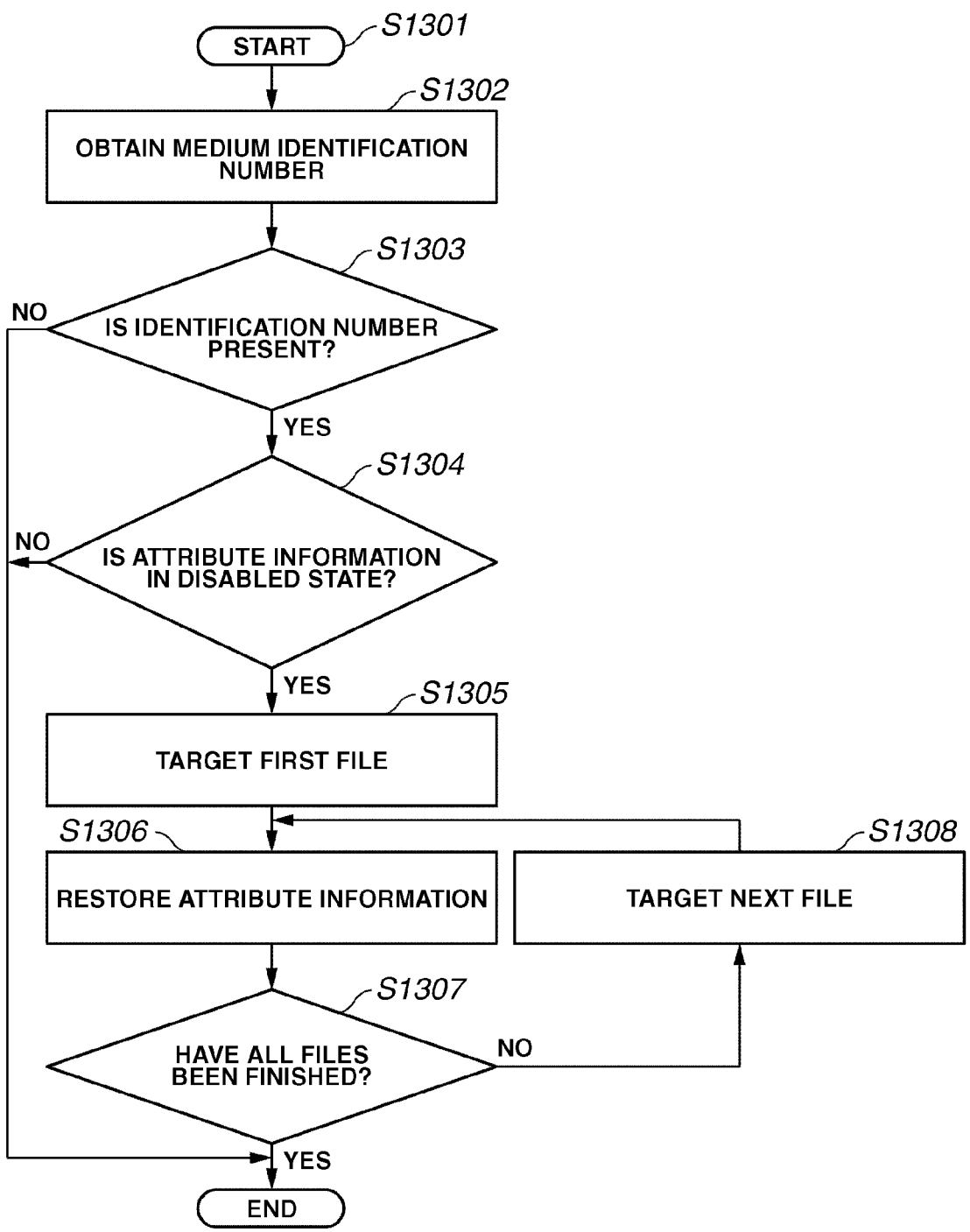
FIG. 13 is a flowchart illustrating an example of an operation procedure for restoring attribute information in an image file according to the second exemplary embodiment.

The present invention includes a case of supplying a software program for realizing the functions of the exemplary embodiments (programs corresponding to the flowcharts of FIGS. 8, 9 and 13 according to the exemplary embodiments)

to a system or an apparatus directly or from a remote place. A case where a computer of the system or the apparatus reads and executes the supplied program code is also included in the invention.

Accordingly, to realize the functional process of the invention by a computer, the program code itself installed in the computer configures the invention. In other words, the invention includes a computer program itself for realizing its functional process.

In this case, as longs as a program function is provided, object code, a program executed by an interpreter, or script data supplied to an operating system (OS) can be employed.

As storage media for supplying programs, for example, a floppy disk, a hard disk, an optical disk, and a magneto-optical disk are available. Also, a magneto-optical disk (MO), a compact disc-read only memory (CD-ROM), a CD-recordable (CD-R), a CD-rewritable (CD-RW), a magnetic tape, a nonvolatile memory card, a ROM, and a digital versatile disc (DVD) (DVD-ROM, DVD-R) are available.

As a method for supplying a program, a method for connection to a web page on the Internet by using a browser of a client computer is available. The computer program itself or a compressed file containing an automatic installation function can be downloaded to a storage medium such as a hard disk to be supplied.

The functional process can be realized by dividing the program code of the program into a plurality of files, and downloading the files from different web pages. In other words, a World Wide Web (WWW) server that instructs a plurality of users to download program files for realizing the functional process of the invention by a computer also configures the invention.

According to another method, the program of the invention is encrypted and stored in a storage medium, such as a CD-ROM, to be distributed to users, and a user who satisfies predetermined conditions is allowed to download key information for releasing the encryption from a web page via the Internet. The functional process can be realized by using the key information to execute the encrypted program and installing the program on the computer.

The functions of the exemplary embodiments can be realized by executing the read program via the computer. Based on an instruction of the program, an OS running in the computer executes a part or the whole of the actual process, and the functions of the exemplary embodiments can be realized by this process.

According to another method, a program read from a storage medium is written in a memory disposed in a function extension board inserted into a computer or a function extension unit connected to the computer. Then, based on an instruction of the program, a CPU installed in the function extension board or the function extension unit executes a part or the whole of the actual process, and the functions of the exemplary embodiments can be realized by this process.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-330956 filed Dec. 7, 2006, which is hereby incorporated by reference herein in its entirety.

What is claimed is:

1. An image file management apparatus capable of managing image data and attribute information associated with the image data, the image file management apparatus comprising:
   a loading unit configured to load a detachable storage media recording an image file including the image data and one or more attribute information associated with the image data;
   an attribute information recording unit configured to record, in a memory different from the detachable storage media, at least one piece of attribute information of the attribution information included in the image file recorded in the detachable storage media loaded on the loading unit, by associating the attribute information included in the image file with an identifier of the image file and identification information of the detachable storage media;
   an attribute information deleting unit configured to delete the attribute information, corresponding to the attribute information recorded in the memory, of the image file recorded in the detachable storage media; and
   an attribute information restoring unit configured to restore the deleted attribute information deleted by the attribute information deleting unit, by using the attribute information recorded in the memory, in a case where the identification information of the detachable storage media, which is loaded on the loading unit, and the identification information of the media recorded in the memory correspond with each other.

2. The image file management apparatus according to claim 1, further comprising:
   a first recording medium removable from the image file management apparatus;
   an encryption unit configured to encrypt at least one attribute information of the image data; and
   a decryption unit configured to decrypt the at least one attribute information encrypted by the encryption unit,
   wherein the loading unit loads the image file in the first recording medium,
   wherein the attribute information recording unit records the at least one attribute information encrypted by the encryption unit in the first recording medium in association with the identifier of the image file, and
   wherein the attribute information restoring unit restores and enables the at least one attribute information decrypted by the decryption unit with respect to the image data.

3. The image file management apparatus according to claim 2, further comprising:
   a second recording medium different from the first recording medium;
   a decryption information recording unit configured to record, in the second recording medium in association with an identifier of the first recording medium, information for decrypting the encrypted at least one attribute information; and
   a decryption information retrieval unit configured to use the identifier of the first recording medium as a retrieval key to retrieve the information for decrypting from the second recording medium.

4. The image file management apparatus according to claim 2, further comprising: a determination unit configured to determine whether the attribute information deleting unit has deleted at least one piece of attribute information included in the image file stored in the first recording medium,
   wherein, when the first recording medium is loaded into the image file management apparatus, if the determination unit determines that the at least one piece of attribute information included in the image file has been deleted, the attribute information restoring unit restores the deleted at least one piece of attribute information.

5. The image file management apparatus according to claim 1, further comprising:
   a first recording medium removable from the image file management apparatus; and
   a second recording medium different from the first recording medium,
   wherein the loading unit loads the image file in the first recording medium,
   wherein the attribute information recording unit records at least one attribute information in the second recording medium, and
   wherein the attribute information restoring unit obtains the at least one attribute information from the second recording medium, and uses the at least one attribute information in the image file to restore the deleted at least one piece of attribute information.

6. The image file management apparatus according to claim 5, wherein the attribute information recording unit records the identifier of the image file and the at least one attribute information in association with an identifier of the first recording medium, and
   wherein the attribute information restoring unit uses the identifier of the first recording medium as a retrieval key to retrieve the identifier of the image file and the at least one attribute information from the second recording medium.

7. The image file management apparatus according to claim 1, further comprising: an image file generation unit configured to generate the image file by capturing an image of a subject,
   wherein the attribute information recording unit records, immediately after the image file generation unit generates the image file, the identifier of the image file and at least one attribute information in association with the identifier of the image file.

8. A method for an image file management apparatus capable of managing image data and attribute information associated with the image data, the method comprising:
   loading a detachable storage media recording an image file including the image data and one or more attribute information associated with the image data;
   recording, in a memory different from the detachable storage media, at least one piece of attribute information of the attribution information included in the image file recorded in the loaded detachable storage media, by associating the attribute information included in the image file with an identifier of the image file and identification information of the detachable storage media;
   deleting the attribute information stored in the first area, corresponding to the attribute information recorded in the memory, of the image file recorded in the detachable storage media; and
   restoring the deleted attribute information by using the attribute information recorded in the memory, in a case where the identification information of the loaded detachable storage media and the identification information of the media recorded in the memory correspond with each other.

9. The method according to claim 8, further comprising:
   encrypting at least one attribute information of the image data;
   decrypting the encrypted at least one attribute information;
   loading the image file in a first recording medium removable from the image file management apparatus;
   recording the encrypted at least one attribute information in the first recording medium in association with the identifier of the image file; and
   restoring and enabling the decrypted at least one attribute information with respect to the image data.

10. The method according to claim 9, further comprising:
    recording, in a second recording medium different from the first recording medium in association with an identifier of the first recording medium, information for decrypting the encrypted at least one attribute information; and
    using the identifier of the first recording medium as a retrieval key to retrieve the information for decrypting from the second recording medium.

11. The method according to claim 9, further comprising:
    determining whether at least one piece of attribute information included in the image file stored in the first recording medium has been deleted; and
    wherein, when the first recording medium is loaded into the image file management apparatus, if it is determined that the at least one piece of attribute information included in the image file has been deleted, restoring the deleted at least one piece of attribute information included in the image file.

12. The method according to claim 8, further comprising:
    loading the image file in a first recording medium removable from the image file management apparatus;
    recording at least one attribute information in a second recording medium different from the first recording medium; and
    obtaining the at least one attribute information from the second recording medium, and uses the at least one attribute information in the image file to restore the deleted at least one piece of attribute information included in the image file.

13. The method according to claim 12, further comprising:
    recording the identifier of the image file and the at least one attribute information in association with an identifier of the first recording medium; and
    using the identifier of the first recording medium as a retrieval key to retrieve the identifier of the image file and the at least one attribute information from the second recording medium.

14. The method according to claim 8, further comprising:
    generating the image file by capturing an image of a subject; and
    recording, immediately after the image file is generated, the identifier of the image file and at least one attribute information in association with the identifier of the image file.

15. A non-transitory computer-readable storage medium storing computer-executable instructions which, when executed by an apparatus, cause the apparatus to perform operations, the non-transitory computer-readable storage medium comprising:
    computer-executable instructions for loading a detachable storage media recording an image file including the image data and one or more attribute information associated with the image data;
    computer-executable instructions for recording, in a memory different from the detachable storage media, at least one piece of attribute information of the attribution information included in the image file recorded in the loaded detachable storage media, by associating the attribute information included in the image file with an identifier of the image file and identification information of the detachable storage media;
computer-executable instructions for deleting the attribute information, corresponding to the attribute information recorded in the memory, of the image file recorded in the detachable storage media; and
computer-executable instructions for restoring the deleted attribute information by using the attribute information recorded in the memory, in a case where the identification information of the loaded detachable storage media and the identification information of the media recorded in the memory correspond with each other.

* * * * *